United States Patent [19]

Parkins

[11] Patent Number: 4,496,847
[45] Date of Patent: Jan. 29, 1985

[54] POWER GENERATION FROM WIND

[76] Inventor: William E. Parkins, 20120 Wells Dr., Woodland Hills, Calif. 91364

[21] Appl. No.: 450,462

[22] Filed: Dec. 16, 1982

Related U.S. Application Data

[63] Continuation-in-part of Ser. No. 385,330, Jun. 4, 1982.

[51] Int. Cl.³ .................... F03D 17/02; F03D 49/02; F04B 49/00
[52] U.S. Cl. ........................ 290/44; 290/55; 417/35; 416/44
[58] Field of Search ................ 290/44, 55; 416/44 A; 322/35; 417/35, 1, 324, 429

[56] References Cited

U.S. PATENT DOCUMENTS

| | | |
|---|---|---|
| 1,001,175 | 2/1911 | Snee . |
| 1,010,591 | 12/1911 | Clements . |
| 1,366,844 | 1/1921 | Snee, Jr. . |
| 2,539,862 | 1/1951 | Rushing . |
| 3,269,121 | 8/1966 | Bening . |
| 3,952,723 | 4/1976 | Browning . |
| 4,031,702 | 6/1977 | Burnett et al. . |
| 4,149,092 | 4/1979 | Cros . |
| 4,274,010 | 6/1981 | Lawson-Tancred . |
| 4,280,061 | 7/1981 | Lawson-Tancred . |
| 4,317,048 | 2/1982 | King ............................ 290/53 |

Primary Examiner—J. V. Truhe
Assistant Examiner—Shelley Wade
Attorney, Agent, or Firm—Lyon & Lyon

[57] ABSTRACT

A wind machine turns a shaft to activate a multistage pump having intake and discharge means respectively coupled to intake and discharge fluid lines. Control means regulates the operative positions of the intake means or discharge means to remove selected stages from effective pumping while at the same time fluid passes into and from the selected stages. The stages can be of different capacities and selected groups or all of them may be periodically sequentially idled. Torque on the shaft is thereby adjusted to retain the shaft speed in a range for effective wind energy conversion. During starting the stages are idled until an operational speed is reached. Power assisted starting can be achieved by initially reversing the fluid flow through selected stages. Constricting means is located in the common discharge line from all stages and can be additionally located in each discharge line from each stage. Slowing or stalling of the wind rotor is effected against overspeed by constriction of the flow from the stages to increase the torque on the shaft. Pressure downstream of the constricting means is maintained substantially constant without the need for energy accumulation. The discharged fluid drives a turbine coupled to a generator wherein the fluid power is converted into electrical power.

32 Claims, 7 Drawing Figures

POWER GENERATION FROM WIND

RELATED APPLICATION

This application is a Continuation-In-Part of my patent application Ser. No. 385,330 filed June 4, 1982 and the contents therein contained are incorporated by reference herein.

BACKGROUND OF THE INVENTION

This invention relates to power generation through a wind machine. In particular the invention is directed to regulating the rotation of a wind responsive rotor of a wind machine during its normal operating phase and during startup and during wind overspeed conditions.

Among the many problems associated with power generation from wind is the difficulty encountered by variable wind conditions which results in a mechanical output from the wind rotor also being variable thereby making it difficult to obtain useful conversion of the mechanical energy into an electrical generator.

Many solutions have been suggested to overcome this problem including the provision of a variable pitch wind rotor whereby the pitch of the rotor will vary according to changes in wind speed. Mechanical and electrical arrangements to effect this variability, however are complicated, and thus it is preferable to employ a fixed pitch rotor.

Another manner of overcoming the variability of the wind speed has been suggested in the feeding of the mechanically generated energy from the rotor to the electrical generator through a hydraulic system which has the ability to accumulate energy and to subsequently release it.

These problems were realized and have been sought to be resolved in the systems for instance in U.S. Pat. No. 4,280,061 (Lawson-Tancred) and U.S. Pat. No. 4,274,010 (Lawson-Tancred). In the systems of both of these patents, however, there is still omitted the major need of providing a simple manner for conveying the hydraulic power effectively to the electric generator. Both these patents propose multiple pumps in the hydraulic feed line from the rotor with one or more, but not all, of the pumps being bypassed from the system as the rotor speed changes, without direct consideration of the wind speed. Additionally in U.S. Pat. No. 4,274,010 an accumulator piston cylinder arrangement is provided downstream of the multiple pumps for effectively accumulating and releasing energy. The output from the pumps is at a variable pressure and, therefore, of necessity, complex and multiple additional equipment is provided to ensure that the hydraulic power transmitted to turn the generator can be beneficially utilized. For instance in U.S. Pat. No. 4,280,061, a variable angle swash plate motor is used downstream of the multiple pumps associated with the rotor and receives the variable pressure hydraulic output from the multiple pumps to effect this transition of power. Multiple control systems are used to regulate the operation of the multiple pumps, the piston and cylinder accumulator, and the variable hydraulic motor. Additionally the pump means employed require relatively complex constructions, and by-passing of unneeded pumps necessitates an overall design and expense requirement for such multiple pumps which should be avoided.

Another earlier attempt at trying to resolve these problems is disclosed in U.S. Pat. No. 2,539,862 (Rushing), and this system also employed hydraulic accumulators for storing energy and means for electromagnetically engaging different numbers of different sized pumps.

Inherently these systems only go part of the way to providing a practical, economical and viable means for utilizing the variable wind power on the rotor.

Consideration, has to the Applicant's knowledge not provided effective means for starting a fixed pitch rotor and for controlling the rotor in overspeed wind conditions which can result in destruction of the wind machine, and which is obviously essential to solve and thereby provide an overall efficient wind power generating system under all wind conditions.

SUMMARY OF THE INVENTION

There is accordingly a need for regulating the rotation of a rotor of a wind machine and for providing from a coupled pump a substantially constant hydraulic pressure which can be simply transmitted to a hydraulic system for, in turn, activating the hydraulic to mechanical energy conversion associated with a generator. Energy accumulation should be unnecessary. There is also a need to ensure effective starting of a wind machine and to provide means to brake the rotor of a wind machine during overspeed wind conditions.

The invention provides a multi-stage pump with intake and discharge means respectively connected to the intake fluid line and discharge fluid line so that each stage of the pump can pump fluid between the intake line and discharge line. Control means regulates the operative positions of the intake or discharge means to remove, at least partially, one or more or all selected stages from effective pumping of fluid between the intake line and discharge line while at the same time fluid passes into and from the selected stages. The idling of a stage can be effected by holding open either the intake or discharge means to the stage.

A first constricting means is located in the common discharge line from all stages, and as a second constricting means can be additionally located in series with each stage between the fluid intake line and the fluid discharge line. In an alternate method of idling selected stages, the control system can regulate the operative positions of this second constricting means and that of an idling means connected between the stage discharge and intake, while at the same time fluid passes into and from the selected stages.

The pressure on the fluid in the discharge line downstream of the first constricting means is retained substantially constant and at the same time the torque of the shaft means can be adjusted so that the rotor shaft speed will operate in a range assuring effective conversion of wind power to shaft power.

For a given design of wind rotor there will be a range of the speed ratio that provides for high efficiency power transfer from the wind to the rotor shaft. The speed ratio is the ratio of rotor speed to wind speed. The optimum range of speed ratio may vary somewhat with wind speed but is normally fairly constant so that the rotor speed needs to be approximately proportional to wind speed for efficient power transfer. The power coefficient, representing the fraction of power in the wind swept by the rotor that is converted into shaft power, is preferably retained above 0.1, and depending on the rotor design is above 0.2 for a speed ratio between substantially 3 and 8, when speed ratio is defined as the ratio of the rotor tip speed to wind speed.

During starting, control means idles pumping stages until the shaft rotates at a predetermined speed and thereafter engages as many stages as appropriate for the wind speed to permit effective pumping of fluid between the intake line and discharge line. Furthermore starting can be assisted by closing the constricting means and an isolating means located in the intake line and using a starting means independent of idling and located in series with selected stages between the intake fluid line and discharge line to open the stage to fluid from the discharge line to the inlet line, namely, reversedly through the stage, and thereafter this power assist starting means is closed and the isolating and constricting means opens to permit effective pump operation.

During overspeed wind conditions the control system partially closes the constricting means, preferably the first constricting means, to increase the pressure on the stages so as to prevent excessive rotor speed and to allow continued operation or alternatively to bring the rotor to a stall.

In a preferred form the pump is of a positive displacement type, and, preferably includes reciprocating pistons in cylinders.

The construction is such that the pump can be located at substantial close adjacency to the rotor so that the drive train between the rotor and the pump is minimized. Thereafter the pump inlet and discharge connects to a hydraulic system for generating electrical power.

In a horizontal axis wind machine the pump can be located on a tower adjacent the rotor, and in a vertical axis wind machine the pump can be located in adjacency with the rotor mounting substantially at ground level.

In some cases the fluid in the system may be water, or other liquids. The fluid may also be a suitable gas.

BRIEF DESCRIPTION OF THE DRAWINGS

FIG. 7 is a diagrammatic view of another embodiment of a pumping arrangement employing an alternate method for cylinder idling.

DETAILED DESCRIPTION

Figure 1:
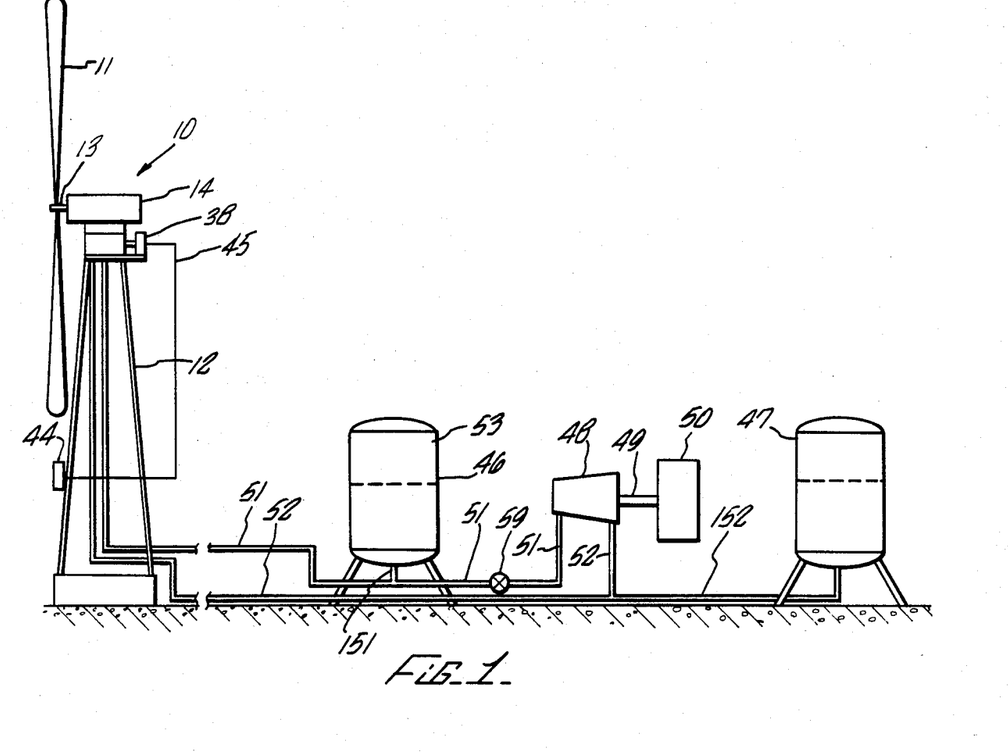
FIG. 1 is a diagrammatic view showing in elevation a wind machine with a horizontal axis rotor connected with the hydraulic system.

A wind machine 10 includes a wind responsive rotor 11 mounted on a tower 12 so that the rotational axis is in a horizontal direction. The rotor 11 is connected with a rotatable shaft means 13 which enters a gear box 14 in which the shaft 13 is supported on bearings 114. The bottom plate 15 of the gear box 14 is mounted on a bearing system 16 so that the gear box 14 can turn in a horizontal plane as determined by the wind direction. Should the direction of the wind change the surface area covered by the rotating rotor 11 will change to face the wind direction as indicated by arrow 17 so that the maximum force of the wind impinges on the rotor 11.

Figure 4:
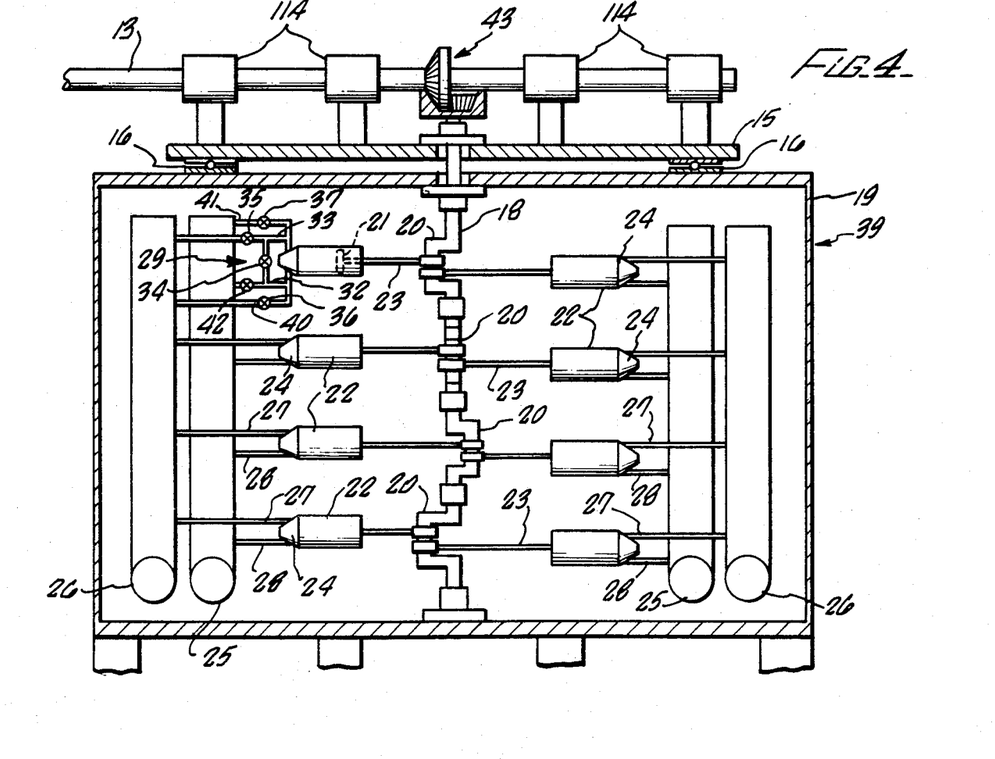
FIG. 4 is an elevational sectional view showing a positive displacement pump with cylinders in relationship to the crankshaft that is coupled through a gear to the rotor shaft.

The shaft 13 is the first component of the rotatable shaft means, the second component being the crankshaft 18 which is directed vertically in the pump housing 19. The crankshaft 18 includes 4 crankarms 20 with a length half of the stroke of pistons 21 which are housed in cylinders 22. Each crankarm 20 drives two pistons 21, 180 degrees out of phase and there are eight pistons 21 which have eight phase angles separated by 45 degrees. Connecting rods 23 couple the crankarms 20 to the pistons 21 at two in-line vertical banks of four cylinders, one bank being slightly displaced vertically from the other. Remote ends 24 of each cylinder 22 are provided with valve arrangements which then connect by a valving arrangement with a fluid inlet line or header pipe 25 and a discharge fluid line or header pipe 26.

A valving arrangement is shown diagrammatically for one cylinder 22 in FIG. 4. The same valving can be applicable for the other cylinders 22 in the pump. For ease of reference however this is shown diagrammatically for the other cylinders by means of an inlet connection pipe 28 and an outlet connection pipe 27 connecting the respective intake fluid line 25 and discharge fluid line 26. In some embodiments of the invention the valving arangement 29 for the one cylinder shown in FIG. 4 can be varied and not all the valves for starting assist need be present for each cylinder 22.

Figure 3:
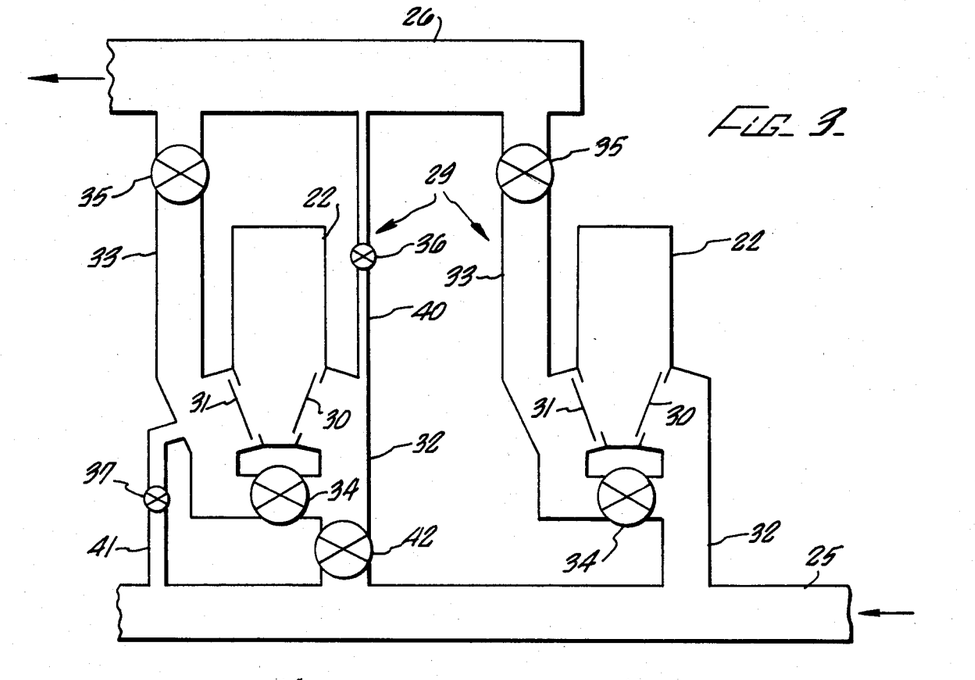
FIG. 3 is a diagrammatic view of a pumping arrangement illustrating the inlet fluid and discharge fluid lines with power operated means for idling cylinders of the pump, and for power assist starting.

With reference to FIG. 3 a detailed description of the valving arrangement 29 is set out. For the example shown of a reciprocating piston pump each cylinder 22 includes intake valve means 30 and discharge valve means 31 which respectively connects through a connection pipe 32 to the inlet 25 and a connection pipe 33 to the discharge line 26. Idling valve means 34 is connected through the cylinder stage 22 to the intake line 25 through the connection pipe 32. In an alternative embodiment the idling means 34 can be connected to the discharge line 26 through the connection pipe 33, but in this event the constricting valve means 35 in the connection pipe 33 between the discharge valve 31 and the discharge line 26 would be connected in connection pipe 32 between the intake pipe 25 and the intake valve 30. As exemplified in FIG. 3 the constricting means 35 is located in series with the selected cylinder stage 22 between the intake line 25 and the discharge line 26, and is between the discharge valve 31 and the discharge line 26.

In the selected stage 22 of the cylinder on the left portion of FIG. 3 adjacent the cylinder 22 on the right portion, there is additionally provided starting assist valve means in series with the stage 22 between the intake line 25 and discharge line 26. The starting assist means includes a valve 42 between inlet line 25 and the intake valve 30 as well as a valve 36 connected between the discharge line 26 and the intake valve 30 and another valve 37 connected between the discharge valve 31 and inlet line 25.

Control means 38 is associated with the pump 39 and with the idling valve 34 and constricting valve 35 so as to regulate their operative positions so that one or more of the selected stages 22 can be removed or added from effective pumping between the intake line 25 and discharge line 26 while fluid passes into and from the selected stage thereby to vary controllably the torque demanded by crankshaft 18 of wind rotor shaft 13. The pressure in the discharge line 26 is retained substantially constant and controlling the number of stages 22 engaged in effective pumping thereby results in changes in the torque demanded of the wind rotor 11 causing changes in its rotational speed for a given power level produced by the wind.

In use of the wind machine 10 the regulating apparatus for controlling the rotor 11 operates under normal wind conditions so that the shaft speed is caused to vary in order to assure a speed ratio that is nearly constant and within a range for efficient conversion of wind power to rotor power. As has been mentioned this optimum range of the speed ratio of rotor speed to wind speed will depend on the design of the rotor and can vary slightly with the wind speed.

Under normal operating conditions the cylinders 22 will be pumping fluid from the intake line 25 through the intake valve 30 past the discharge valve 31 and into the discharge line 26. The idling valve 34 is closed and the constricting valve 35 open. As the wind speed drops the rotor, which provides power substantially proportional to the cube of the wind speed reduces its rotational speed and the rotation of the shaft 13 and shaft 18 will slow since the pump is pumping against a nearly constant pressure difference.

The speed ratio also decreases and the control means 38 at this time will activate idling valve 34 and constricting valve 35 on one or more of the selected cylinders 22 so that the constricting means 35 closes and the idling means 34 opens. Fluid is then prevented from passage through the selected stage 22 to the discharge 26, however it instead passes into and from the cylinder 22 through the idling means 34 while the piston 21 continues to reciprocate. These stages 22 then pump against substantially zero head at the pressure of the intake line 25. The flow from the pump 39 and the torque required by the pump 39 is thereby reduced allowing the wind rotor to rotate faster to simultaneously increase the speed ratio to within the desired predetermined range. The rotor 11 assumes a higher rate of rotation with the power delivered by the pump 39, and the flow from the pump 39 being substantially the same.

To maintain the speed ratio within the desired range, while anticipating further reduction in wind velocity on the rotor 11, the idling valve 34 and constricting valve 35 of further stages of the pump 39 can be actuated so that fewer stages effectively pump and the rotor 11 can increase its rotational rate to a new value to efficiently capture the lower amount of power resulting from the lower wind speed. This can progressively continue as the wind speed drops and various stages are idled from effective pumping into the discharge line 26. At all times, however, on cylinders that have been idled the pump fluid passes through valves 30 and 31 of each cylinder 22 and the idling valve 34 as the piston 21 reciprocates.

The control means 38 operates with the valves 34 and 35 for each stage without the use of gears or clutches. With the positive displacement reciprocating piston pump an important advantage is achieved in the matching of the low rotational speeds and high torques which are characteristic of the rotating shaft 13 achieved in wind power machines and also in such pumps. Other types of positive displacement pumps can be used.

Starting the wind rotor 11 is effected in one of two ways. With the valving system illustrated on the right hand side of FIG. 3 the operation would be that all the idling valves 34 would be open and the constricting valves 35 closed so that a low wind speed may automatically start rotation of rotor 11. When the rotor speed has increased sufficiently a first stage would be valved into service by closing the idling valve and opening the constricting valve, and progressively more stages would be put on line as dictated by increased wind speed. At all times with the idling valve open fluid can pass into and from the cylinders 22.

The alternative starting method is used when a power assist is required to cause the rotor 11 to spin at a sufficient initial rate. By opening valves 36 and 37 cross-connecting the intake line 25 with the discharge line 26 through the cylinder 22, pressure is used from the discharge line 26 to drive the piston 21 as fluid passes from the discharge reversedly to the intake through lines 40 and 41. In this arrangement an additional valve 42 is placed in line 32 and closed to isolate the intake line 25 from direct connection to the discharge line through line 40. Also, for power assist starting idling valve 34 and constricting valve 35 must be closed. Selected cylinders can have this cross-connection and valve arrangement, while other cylinders not participating will be idled by opening the idling valves 34 and closing the constricting valves 35. This alternative starting assist of the rotor 11 could have importance for horizontal axis fixed pitch rotor machines and will probably be required for vertical axis wind machines.

For the valving arrangement to function properly during power-assist starting and similarly to prevent the shunting of fluid through the cylinder 22 from the discharge manifold 26 to the intake manifold 25, it is necessary to provide mechanisms to hold the discharge valve 31 closed during the power stroke and to hold the intake valve 30 closed during the return stroke. This is basically a steam engine operation, but it will require power valves rather than the use of check valves for the cylinder intake valve 30 and discharge valve 31.

Protecting the wind machine against overspeed conditions which can result in system damage is achieved by gradual closing of the constricting valves 35 so that the pump 39 requires increasing power as it pumps against an increasing pressure to the one being maintained in the discharge line 26. As a result the rotational speed of the rotor shaft 13 decreases, and in doing so the kinetic energy of the rotor 11 is dissipated in a warming of the fluid passing through the cylinders 22 of the pump. As the rotor 11 is forced to a lower value of the speed ratio the constricting valves 35 may be left partially closed to allow the rotor to continue operating at an inefficient speed ratio and pumping to continue. Alternatively the constricting valves 35 can continue to be gradually closed. At some further lowered speed of the rotor 11 it will stall and when the constricting valves are finally closed the mechanical system will be effectively locked. When the wind speed falls to manageable levels the system can be started again by the appropriate control of the valves 30, 31, 34, 35, 36, 37 and 42.

During the braking in overspeed wind conditions stresses from high torques could occur on crankshaft 18 and this can be reduced by the choice of the bevel gear ratio for the gear 43 in the gear box 14. The ratio of the torque on shaft 18 to that on the wind rotor shaft 13 will be in the inverse ratio of their respective rotational speeds as determined by gear 43.

In the system the positive displacement pump which is mechanically simple is an advantage in wind machines since the rotor speed is relatively low. With the arrangement of the positive displacement pump in close adjacency to the gear box and mounting of the rotor shaft 13 useful and simple arrangement is achieved for generating power from wind machines.

Increasing the number of cylinders of the positive displacement pump can reduce the rate of rotation required of the crank shaft 18 and be provided by an appropriate change of the gear ratio of the gear 43, and, while pump cost would be increased, this would be offset by smooth control of the speed ratio as achieved by the independent control of the different more numerous cylinder stages.

The control system 38 itself is an electrical system designed to perform substantially automatically. The critical parameter is the rotor speed to wind speed ratio and this is determined by a wind speed sensor 44 mounted on the tower 12 and connected electrically through line 45 to the controller 38, together with a sensor at shaft 13 to determine the rotational speed of the wind rotor. The speed ratio is electronically calculated and averaged to avoid the effect of wind gusts and then is directed to a programmed control system to actuate the power driven valves 30, 31, 34, 35, 36, 37 and 42.

Although the wind sensor which is an anemometer is shown mounted to the tower at a relatively low level it could be located elsewhere. For a horizontal axis wind machine it could be suspended from an assembly projecting axially outward from the hub of the rotor. If the assembly rotates with the rotor, electrical signals from the anemometer could be carried back to the controller 38 by means of slip rings. The anemometer can also include a vane with sensors to effect a measurement to determine the relative direction of the wind 17 which in turn can be translated into signals to automatically activate drive motors to rotate the bottom plate 15 of the gear box relative to the pump housing 19 to ensure that the rotor is directed appropriately relative to the wind direction.

The fluid through pump 39 is a hydraulic fluid, preferably water, and the function of the pump 39 is to pump water into a hydraulic system which includes a high pressure reservoir 46 coupled with a low pressure reservoir 47 and a hydraulic to mechanical conversion turbine between the reservoirs 46 and 47. Turbine 48 translates mechanical energy to turn the shaft 49 of an electrical generator 50. The discharge pipe 26 is connected with the feed line 51 to the turbine 48 and the intake line 25 is connected with the return line 52 from the downstream side of the turbine 48. The high pressure reservoir 46 is designed so that gas within the hydraulic system can be trapped above the free surface of liquid in the reservoir as indicated by numeral 53. Thus should by chance the volume of liquid in the reservoir 46 increase slightly above its normal value as a result of a mismatch of pump and turbine flows, the gas 53 will be slightly compressed. Should by chance the volume of liquid in the reservoir 46 be decreased slightly below its normal value the degree of compression of the gas in space 53 will be slightly lowered. It is the intention to maintain the liquid volume and the pressure in reservoir 46 essentially constant at predetermined values. The liquid volume and pressure could temporarily drop slightly when the valves at a pump are operated to provide pressurized assist for rotor startup.

The rate of flow of fluid into the turbine 48 is determined by the amount of wind rotor power being translated to the pump. In order to maintain essentially constant liquid volume and pressure in reservoir 46, the turbine inlet valve 59 is continuously and automatically adjusted to maintain the liquid level in reservoir 46 close to a prescribed value. A connection pipe 151 connects the reservoir 46 with the feed line 51. Thus the flow rate through turbine 48 closely matches the pumping flow rate and the pressure of the gas in space 53 tends to remain constant. Low pressure reservoir 47 is connected to the turbine discharge and the return line to the pump by line 152, and also has a prescribed volume of liquid and pressure which will tend to remain constant since, except for small leakages, the rate of flow to the pump 39 will be equal to the rate of flow from the pump 39. In cases where the pump is mounted essentially at ground level the low pressure reservoir can be atmospheric pressure.

The generator 50 is preferably a synchronous generator thereby permitting generation of electricity at a frequency and phase compatible with the local electrical grid frequency and phase. Since the power provided by turbine 48 through shaft 49 to generator 50 will vary approximately proportionally to the flow rate through turbin 48, the electrical power fed to the grid must correspondingly vary. This will be achieved while still maintaining a sufficiently synchronous rate of rotation of generator 50 because of the frequency locking effect provided by the electrical grid. An alternative form of electric generator can be an induction generator or a D.C. generator.

Figure 2:
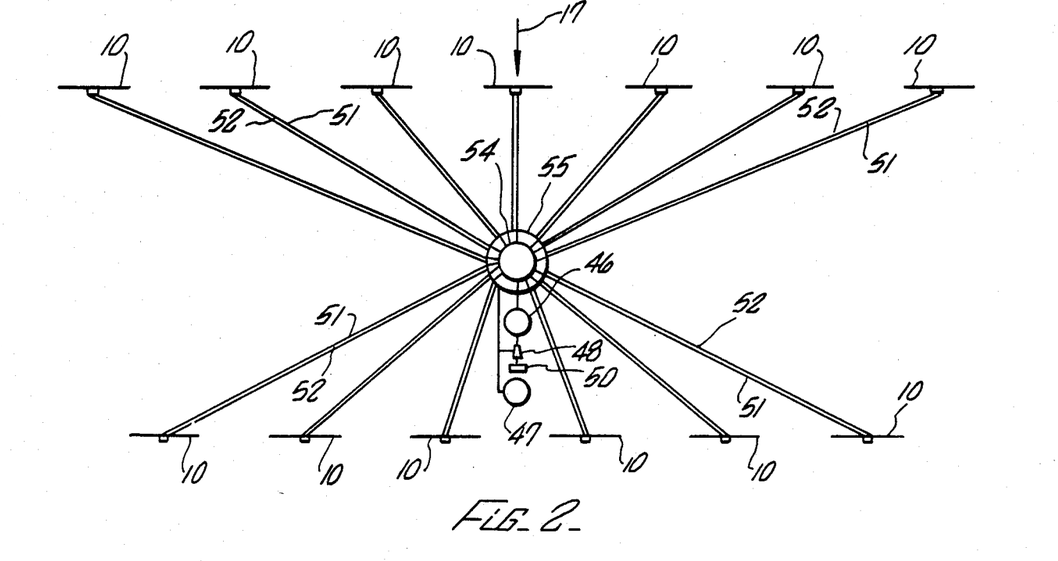
FIG. 2 is a plan diagrammatic view of a wind farm showing multiple wind machines connected through the hydraulic system to a single hydraulic to mechanical power conversion means associated with a generator.

In a preferred system using the wind machine 10 of the invention several such machines are laid out strategically on a wind farm as shown in FIG. 2, thereby to be directed towards the prevailing wind. Feed pipe 51 and return pipe 52 connect each of the wind machines with an inlet manifold 54 and outlet manifold 55 for a common electrical generating installation so that the cumulative supply of wind power over the farm area can be usefully converted in the same hydraulic system. It is preferred that the wind rotors, whether of the horizontal or vertical axis type, be of fixed pitch construction thereby adding to the overall design simplicity.

Since the power provided by the wind through the wind rotors and pumps to the common hydraulic system can vary over a wide range, the flow of fluid to the turbine 50 can also vary proportionally over a wide range. In order to assure high tubine power conversion efficiency over the wide range of possible flow rates it may be desirable to incorporate more than one turbine of differing sizes. Each would have its own automatically controlled inlet valve admitting fluid from the pump discharge line 51. The turbines could have a common or separate shafts. For the purpose of obtaining high efficiency electric power generation, one or more generators of differing sizes driven by the multiple turbine arrangement could also be employed. The control means already described to assure the generation of electrical power compatible to the local grid would still be applicable.

Figure 5:
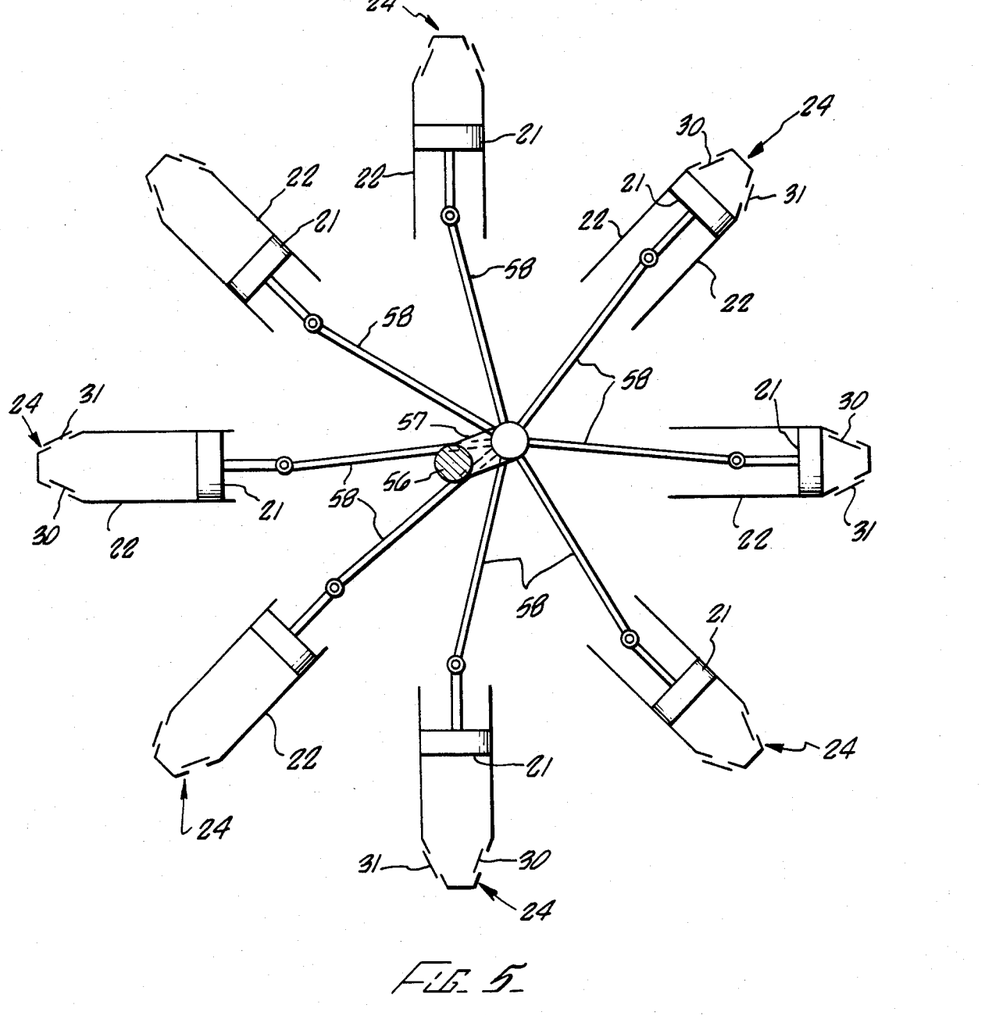
FIG. 5 is a diagrammatic plan view of a positive displacement reciprocating piston pump arranged radially.

In FIG. 5 there is illustrated an eight cylinder single-acting radial pump suitable for vertical or horizontal axis wind rotors. The crankshaft 56 can be directly coupled to the wind rotor shaft 13 with or without fixed-ratio gearing to change relative rotational speeds. The single crankarm 57 on the crankshaft will have a length one-half of the stroke of pistons 21 which ride within the cylinders 22. There are eight connecting rods 58 to the pistons which are located with vertical displacement relative to a common horizontal plane and have eight phase angles separated by 45°. The inlet valve 30 and outlet valve 31 are shown at the remote ends 24 of the pistons and these valves are connected in a manner similar to that described with reference to the embodiment of FIG. 4 in a valving arrangement as described in FIG. 3.

Another embodiment of the invention is described with reference to FIG. 6 whereby in the reciprocating piston pump example, idling of a cylinder 22 is accomplished by another means. In this embodiment the idling valve 34 and the line connecting between inlet valve 30 and discharge valve 31 are omitted. The valve 30 and 31 are check valves. Instead, a mechanically power actuated plunger or other means 110 is provided for holding valve 30 open, and the reciprocating piston 21 simply forces the hydraulic fluid back and forth from the inlet line 25. In an alternative arrangement the holding mechanism 110 can be operative with the discharge valve 31 and the fluid will be forced back and forth from the discharge line 26. With either of these methods that depend on holding open a cylinder valve 30 or 31, the cylinder could be idled without any simultaneous use of a constricting valve 35, as, for example, in the embodiment of FIG. 3.

Figure 6:
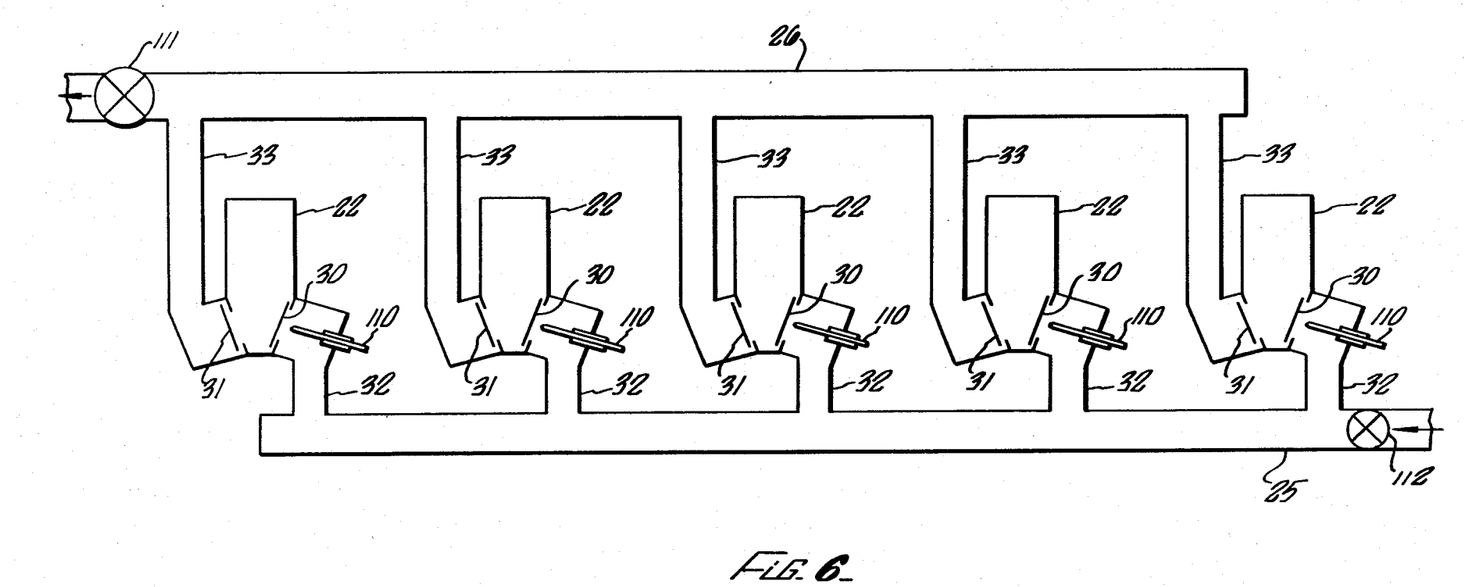
FIG. 6 is a diagrammatic view of another embodiment of a pumping arrangement employing an alternate method for idling of cylinders.

The embodiment of FIG. 6 illustrates the use of a single constricting valve 111, namely as the first constricting means, in the discharge line 26 carrying the combined flow from all cylinders 22. Constricting valve 111 in the line 26 provides the function of braking and locking of the wind rotor. An advantage of using one constricting valve 111 is that during braking it will increase the pressure on all cylinders 22 equally, whereas with separate valve 35 for each of the cylinders 22 it may be more complex for the control system to keep the pressures balanced. This could result in excessive stresses on certain cylinders 22, and the pistons 21 and their drives.

Where a single constricting valve 111 in the common discharge line 26 is used, with power-assist starting, all cylinders 22 would participate in the powered starting, rather than employing only a few cylinders 22 and idling other cylinders 22. In this event only one isolating valve 112 in the common intake line 25 and only two cross-connecting lines 40 and 41, with a valve in each would be necessary. The cross-connecting lines would go from the normally down-stream side of the constricting valve 111 to the normally downstream side of the isolating valve 112, and from the normally upstream side of the constricting valve 111 to the normally upstream side of the isolating valve 112. For such power-assist the constricting valve 111 and isolating valve 112 would be closed and the cross-connecting valves open. When the rotor 11 had gained sufficient speed, all these valves would be reversed and a number of cylinders 22 idled as appropriate for the existing wind speed. As previously stated, this power-assist starting requires that mechanisms be provided to hold discharge valves 31 closed during the power stroke and inlet valve 30 closed during the return stroke.

In an alternative embodiment the power-assist feature could utilize a driver separate from the pump. It could have its own idling means and be permanently geared to the rotor shaft 13, or it could be clutched to the shaft 13 when needed. Its power could be drawn from the pressure difference existing between the discharge manifold 26 and intake manifold 25. In this embodiment the driver would be basically a hydraulic engine, having lower horsepower than the pump. No isolating valve 42 or 112 nor cross-connecting lines 40 and 41 with valves 36 and 37 at the pump would be needed. Should cylinder idling be achieved by an actuator 110 holding a cylinder valve, preferably the inlet valve 30, open for each cylinder; there would be only one other power-actuated valve at the pump, and that would be the single constricting valve 111.

FIG. 7 shows another embodiment that requires only a single power actuated constricting valve. It is here unnecessary to have means for holding cylinder valves 30 or 31 open, but instead between the inlet and discharge of each pump cylinder 22 there is a power driven idling valve 34. In this arrangement a check valve 113 instead of a power driven constricting valve 35 is placed in each cylinder discharge line 33. Another workable alternative would be to place check valve 113 in the inlet line 32. In either case the control system simply opens idling valves 34 to remove cylinders 22 from effective pumping and partially closes the constricting valve 111 when braking action is called for.

A further embodiment for regulating the wind rotor is achieved by idling the equivalent of fractions of one cylinder 22, namely providing at least one stage with a different capacity relative to remaining stages. It is standard practice in the use of reciprocating piston pumps to place annular liners in the cylinders 22 and reduce the diameter of the pistons 21 to match the liners, in order to change the pumping flow rate for a given drive shaft speed. Normally, of course, all cylinders 22 in a pump are treated the same when a change in rating is made by this method. However, not all cylinders 22 need to be treated the same, and this offers the possibility of greatly increased flexibility in the regulation of a coupled wind rotor 11.

As an exemplification, suppose the cross sectional area of only one cylinder 22 in a multi-cylinder pump were reduced 50% by the insertion of an appropriate liner and piston. That cylinder 22 when pumping would demand an average torque equal to one-half that of the others. This then would permit the use of the equivalent of half-integral steps in the average torque load on the wind rotor shaft 13. Idling that lined cylinder 22 would reduce the load by the equivalent of one-half of a cylinder. Then engaging the lined cylinder while idling another cylinder would reduce the load by the equivalent of another half of one cylinder, and so on. Thus a six cylinder pump with one cylinder lined in this way could be used to give twelve equal steps in the total torque demanded, assuming the pumping to be always against a constant pressure difference.

A practical problem tha coulsd arise when one or more cylinders of a reciprocating piston pump are idled, relates to the mechanical stresses caused by the uneven flow of fluid from the pump and the uneven torque applied to its drive shaft when cylinders are idled. These difficulties are overcome by periodic idling of all of the cylinders of the pump, so that they are all engaged in pumping or none are engaged in pumping. The average torque on the pump drive shaft, and the average discharge flow of the pump when pumping against a constant pressure difference, are then proportional to the fraction of the time that all cylinders are engaged in pumping.

In practice this is achieved by holding a valve, preferably the inlet valve 30, open. A solenoid actuated mechanical plunger 110 moves forward with the inlet valve plug on the suction stroke and locks in position holding that valve 30 open until the control system again engages the cylinder 22 in pumping. At that time the plunger 110 unlocks and is pushed back to its rest position by the valve plug at the beginning of the following discharge stroke. The cylinders 22 can be idled in crankshaft sequence by use of a distributor on the pump drive shaft. The distributor actuates the solenoids for idling, and again actuates solenoids at the cylinder valves in crankshaft sequence for resumed pumping. The result is that the total pump flow and crankshaft torque coast down smoothly when idling is induced, and increase smoothly when pumping is resumed. In the operational practice the average torque on the wind rotor shaft would be controlled not by idling different numbers of cylinders, but by idling a selected group of cylinders or all of the cylinders for different fractions of the time. This can work well in the wind power application because the wind rotor 13 also functions as a large flywheel. The control system would operate in exactly the same way, using the ratio of rotor shaft speed to wind speed to decide when to actuate the plungers 110 to make a group of cylinders or all either idle or engage in pumping. This again is a means for adjusting the torque on the shaft, but wherein the speed of the wind rotor is allowed to hunt around its optimum value for a given wind speed.

Aside from the benefit of allowing the pump to run smoothly and avoid periodic stresses that could lead to failure by mechanical fatigue, there are two other great advantages to this method. One is that the pump can be designed to operate at higher speed thereby reducing the cylinder diameter, length of piston stroke, connecting rod loading, and pump cost. The other advantage is that the control of average torque applied to the wind rotor shaft 13 is not limited to incremental steps as determined by the fraction of the number of cylinders that can be idled, but with this method can be made almost continuously variable. All or a selected group of the pump cylinders can be idled or engaged within one revolution of the pump crankshaft. That capability together with the rotational inertia provided by the wind rotor 13 permits very fine adjustments in the speed of the wind rotor. It follows, then, that the "speed ratio" can be held to its optimum value for efficient wind power conversion.

There is still another method of using valve control to partially idle and thereby vary the torque required to drive a multiple cylinder positive displacement pump. Since the pistons of different cylinders are operated in different phase relationships, opening a valve in a pipe that connects two cylinder chambers together has the effect of reducing the net discharge flow from the connected cylinders and the torque on the pump drive shaft.

Returning to the embodiment described in connection with FIGS. 3, 4 and 5 in which cylinder idling is accomplished by opening an idling valve 34 and closing a constricting valve 35, there can still be a benefit in using an additional single constricting valve 111 in the discharge line carrying flow from all of the cylinders. In this embodiment the first constricting means is valve 111, and the constricting valve 35 is the second constricting means. The advantage of this is that braking is normally carried out only when all cylinders 22 are pumping, and braking could be accomplished by the actuation of the single constrictive valve 111 in the common discharge, even while individual constricting valves 35 at each of the cylinders are left open. Another benefit of this method is that the maximum pressure developed in each of the cylinders will then be the same.

The apparatus and method of regulating the rotor speed of a wind machine, provides a simple and effective means for operating a wind machine to efficiently generate electricity from the wind. With the pumps in adjacency to the gear box and with the nature of the pumps providing idling of hydraulic fluid through selected cylinders an effective means for converting wind to electricity efficiently is achieved which does not require complex rotor construction, and substantially eliminates problems of over-speed wind conditions, provides simple means for starting rotor rotation and uses the minimum of control equipment to regulate the pump means pumping hydraulic fluid through the system. The need for variable hydraulic motor means, multiple pumps and energy accumulators in the hydraulic system is substantially overcome, and all the power generated by the rotor, except for normal system losses, is translated directly and effectively through the hydraulic system to provide rotational power at the turbine.

In situations where it is desired to produce only mechanical rather than electrical power, the same arrangements as have been described but without the electrical generation can be used. Examples are land installations requiring mechanical power located near wind machines and ships requiring mechanical power for propulsion. In the latter case, rather than to use sails, one or more wind rotors with associated pumping means may be mounted on shipboard to provide the hydraulic fluid flow to power a turbine coupled to the ship's screw drive shaft. Such an arrangement permits the ship to be steered in any direction, independent of wind direction. For cruising in harbors or during other situations when the wind might result in excessive ship speed, the valve regulating means could idle more than the normal number of pumping stages so that the speed ratio would be too high for efficient wind power conversion, and still there would be no danger of rotor stalling. The ship speed could be further reduced by partial constriction by the valve constricting means on whatever stages were still engaged in effective pumping.

In some cases it may be necessary to incorporate heat exchange means to prevent overheating of the circulating fluid.

Although there has been shown and described the fundamental novel features of the invention as applied to preferred embodiments thereof, it will be understood that various ommissions and substitutions and changes in the form and the details of the invention illustrated and their operation may be made by those skilled in the art without departing from the spirit and scope of the invention, which should be limited only as indicated by the scope and the claims appended hereto.

I claim:

1. Apparatus for regulating the rotation of a wind responsive rotor of a wind machine comprising rotatable shaft means driven by a rotor thereby to be rotatable in response to wind action on the rotor, the shaft means being adapted to activate multistage pump means, each stage having intake means coupling a common fluid intake line with the stage and disharge means coupling a common fluid discharge line with the stage, first constricting means located in the common discharge line from the stages, control means to regulate controllably the operative positions of the intake means or discharge means on selected stages and the first constricting means thereby to change the pumping status of the stages effectively pumping fluid between the intake line and discharge line, fluid being adapted to pass into and from all the selected stages thereby to vary controllably the torque on said shaft for a given shaft power transmitted thereby to permit regulation of the rotor rotational speed.

2. Apparatus as claimed in claim 1 including second constricting means located in series with said selected stages between the intake line or the discharge line, idling means communicating with said selected stages and either the fluid intake line or the fluid discharge line conversely to the connection of the second constricting means with the intake line or discharge line, the control means acting to regulate controllably the operative positions of the first and second constricting means and the idling means to change the pumping status of selected stages effectively pumping fluid between the intake line and the discharge line, fluid being adapted to pass into and from all the selected stages thereby to vary controllably the torque on said shaft for a given shaft power transmitted thereby to permit regulation of the rotor rotational speed.

3. Apparatus as claimed in either claim 1 or claim 2 including isolating means in the common intake line, and starting means located with the stages between the common intake line and the common discharge line to open the stages to both the common intake line and the common discharge line, the control means being adapted to regulate controllably the constricting means, isolating means and starting means to cause, through the starting means, a predetermined fluid flow from the common discharge line through the stages to the common intake line thereby to impart a torque to the shaft to increase the rate of shaft rotation.

4. Apparatus as claimed in any one of claims 1 or 2 wherein the control means is adapted to regulate the rotor rotational speed to maintain, during normal wind conditions, a speed ratio between predetermined levels, and in overspeed wind conditions is adapted to controllably close at least partly the constricting means thereby to increase controllably the pressure on at least some of said selected stages and the torque on said shaft means and effect a speed regulation of said rotor.

5. Apparatus as claimed in either of claims 1 or 2 wherein each stage of the pump includes reciprocating piston means in cylinder means, and said constricting means, intake means and discharge means are valve means.

6. Apparatus as claimed in claim 2 wherein at least one of the intake means, discharge means, constricting means or idling means is power activated valve means and other of said intake means, discharge means constricting means or idling means is a check valve means.

7. Apparatus as claimed in claim 5 wherein at least one stage is of different output capacity relative to the remaining stages.

8. Apparatus as claimed in claim 6 wherein the control means is adapted to effect idling or constriction of at least one stage, the pump means being operable with other stages which are not subject to idling or constriction.

9. Apparatus as claimed in claim 7 including means to effect periodic idling of selected groups or all of the stages during pump operation.

10. Apparatus as claimed in claim 5 including wind speed sensor means operatively mounted in relation to the wind rotor, and including rotor speed sensor means, such wind speed sensor means and rotor speed sensor means being adapted to input a signal to the control means thereby to facilitate regulation of the valve operation.

11. Apparatus as claimed in claim 5 wherein the shaft means includes at least two components, a first component being connected to the rotor and a second component being the pump drive shaft, the two components being operatively coupled to each other.

12. Apparatus as claimed in claim 11 wherein the operative coupling includes gear means.

13. Apparatus as claimed in claim 11 wherein either or both shaft components are substantially vertically or horizontally oriented.

14. Apparatus as claimed in claim 13 wherein the pump means is mounted in substantial adjacency with the shaft component from the rotor, thereby minimizing the drive distance between the rotor and the pump means.

15. Apparatus as claimed in claim 14 wherein the pump means is mounted on a tower, the tower being adapted to mount the rotor.

16. Apparatus as claimed in claim 14 wherein the pump is mounted substantially at ground level, the mounting for the rotor also being substantially at ground level.

17. Apparatus as claimed in either of claim 1 or 2 wherein the intake line and discharge line are adapted to be connected with a hydraulic system, such system including a hydraulic to mechanical power conversion means connected between said lines.

18. Apparatus as claimed in claim 17 wherein the hydraulic system is adapted to include valve means upstream of the hydraulic to mechanical energy conversion means and the system includes a high pressure fluid reservoir and a low pressure fluid reservoir connected to the system, such system being adapted to operate with a predetermined amount of gas in the fluid reservoirs thereby to facilitate substantially constant fluid pressure in the hydraulic system.

19. Apparatus as claimed in claim 17 wherein such conversion means is adapted to turn the rotor of an electrical generator.

20. Apparatus as claimed in claim 19 including such generator being a sychronous generator for generating electricity at a frequency substantially synchronous the mains supply frequency.

21. Apparatus as claimed in claim 5 wherein the rotor of the wind machine is fixed pitch.

22. Apparatus as claimed in claim 17 including several wind machines hydraulically coupled to the same hydraulic system.

23. A method of regulating the rotation of a wind responsive rotor of a wind machine having rotatable shaft means for rotation in response to wind action on the rotor, comprising activating multi-stage pump means with the shaft, coupling a common fluid intake line and a common fluid discharge line through valve means with said stages, idling selected or all stages, and constricting all said stages in the common discharge line, said idling and constricting being controllably regulated to change the pumping status of selected stages effectively pumping fluid between the common intake line and the common discharge fluid line while passing fluid into and from the selected stages thereby to vary controllably the torque on said shaft means and regulate the rotor rotational speed.

24. A method of regulating the rotation of a wind responsive rotor of a wind machine having rotatable shaft means for rotation in response to wind action on the rotor, comprising activating multistage pump means, coupling a common fluid intake line and a common fluid discharge line through valve means with the stages, constricting all stages in the common discharge line, idling at least one of the stages, further constricting selected stages between the common intake line and the common discharge line, said constricting and idling being controllably regulated to permit a predetermined fluid flow between the common inlet and common discharge lines through said selected stages thereby to control the torque on the shaft to maintain desired shaft rotational speed.

25. A method as claimed in either claim 23 or 24 including regulating the shaft speed responsive to a predetermined speed ratio range.

26. A method as claimed in either of claims 23 or 24 including controlling all stages thereby selectively idling and constricting all said stages.

27. A method as claimed in claim 26 including periodically idling selected groups or all of the stages.

28. A method as claimed in claim 26 including sensing the wind speed and rotor speed and employing said sensing in controlling the regulation of the idling and constricting.

29. A method as claimed in either of claims 23 or 24 including converting fluid power to mechanical power.

30. A method as claimed in claim 29 including causing the mechanical power to turn a rotor of an electrical generator.

31. A method as claimed in claim 30 including generating electricity substantially synchronous to the mains supply frequency.

32. A method as claimed in claim 31 including coupling several wind machines to the fluid power converting system.

* * * * *